Jan. 13, 1953  M. C. CHOATE  2,624,998
SAGEBRUSH PULLER OR UPROOTER
Filed June 15, 1949  2 SHEETS—SHEET 2

INVENTOR
MILES C. CHOATE
BY

Patented Jan. 13, 1953

2,624,998

UNITED STATES PATENT OFFICE 2,624,998

SAGEBRUSH PULLER OR UPROOTER

Miles C. Choate, Tangent, Oreg.

Application June 15, 1949, Serial No. 99,170

12 Claims. (Cl. 55—66)

This invention relates to a machine for pulling or uprooting sage brush of various types, etc., in clearing land for agricultural purposes.

Throughout the country there are vast acreages of fertile land highly suitable for agricultural purposes which are overgrown with brush of various types, and particularly in the States of Washington and Oregon are thousands of acres of fertile land overgrown with sage brush which must be removed to clear the land for agricultural purposes. Heretofore, this has been a "back breaking" laborious and relatively long time-consuming task and such machines as have been designed for this work are either ineffective or very expensive, rendering it impractical for a prospective farmer to clear the land and resulting in the land lying as wastelands of little value, and the loss of the possible profitable agricultural crops which could be grown thereon if the land could be cleared of the brush in a practical manner and at an economical cost.

An object of the present invention is to provide a machine which is relatively simple in construction, can be manufactured at a cost which will enable it to be sold at a price commensurate with the economical and practical clearing of land of brush, and which machine will effectively uproot the brush, pulling the roots from the ground so that regrowth will be prevented.

Another object of the present invention is the provision of a brush puller which includes a plurality of uprooting teeth so shaped as to dig into the earth among the roots of the brush and gripping the roots uproot them and the brush as the machine travels over the land; to provide adjustment so that the depth at which the teeth penetrate the ground may be regulated to suit local conditions, and a brush puller which after a quantity of brush has been uprooted and accumulated on the machine may be dumped to discharge the uprooted brush in piles for burning or ready removal from the field.

A further object of the invention is to provide in a brush puller as specified, novel, simple means to effect dumping of accumulated brush therefrom during travel of the machine and also to provide double rows of teeth so that as the machine proceeds, during the dumping action a successive set of teeth will move into brush-uprooting position and be stopped at the proper position to regulate their depth of insertion into the ground.

With these and other objects in view, as may appear from the accompanying specification, the invention consists of various features of construction and combination of parts, which will be first described in connection with the accompanying drawings, showing a sage brush puller or uprooter of a preferred form embodying the invention, and the features forming the invention will be specifically pointed out in the claims.

In the drawings:

Figure 3 is a fragmentary plan view of the brush puller showing parts in section, the section being taken on line 3—3 of Figure 2.

Figure 1:
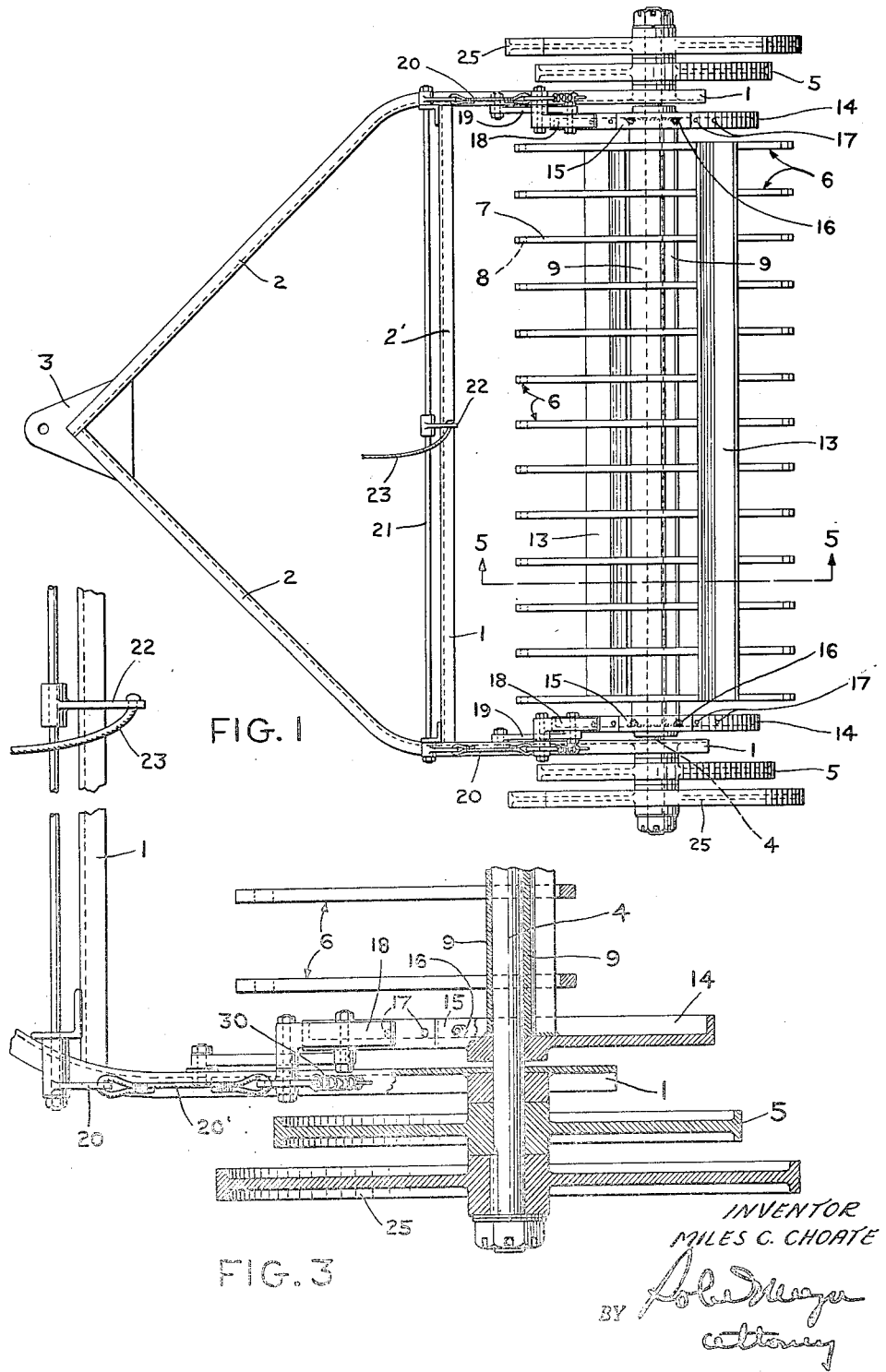
Figure 1 is a top plan view of the brush puller.

Referring more particularly to the drawings, the improved brush puller or uprooter includes a supporting frame 1, including sides 2 and lateral braces 2'. The sides 2 of the frame converge at the front or forward end of the machine, as clearly shown in Figure 1 of the drawings, and have a tractor hitch 3 of any suitable type attached to the forward end to permit connection of the brush puller or uprooter to a tractor.

An axle 4 is rotatably supported by the frame 1 and it has a pair of supporting traction wheels 5 and 5' mounted thereon for rotation independently of the axle.

Attached rigidly to the axle 4 at spaced points along its length are uprooting tooth assemblies or uprooting teeth structures 6, each of which comprises a pair of metal bars 7 and 8 attached to the axle 4 by suitable channel irons 9. While in the drawings the channel irons 9 are shown welded as at 4' to the axle and welded as shown at 7' and 8' to the tooth bars 7 and 8, it is to be understood that they may be attached in any suitable practical manner. The bars 7 and 8 are spaced upon opposite sides of the axle 4 and extend in both directions substantially radially of the axle, having their portions 10 bent slightly so that the ends of the two bars engage and are joined by welding as shown at 10' or otherwise at their outer free ends, as clearly shown at 11. The engaging connected free ends of the tooth bars 7 and 8 are cut or sheared so as to provide sharp edges 12 for digging into the ground and engaging or contacting roots of various types of brush for uprooting the brush during the travel of the machine over a piece of ground. The various uprooting teeth units 6 provide, by their construction, a series of radially opposed teeth and the teeth projecting radially in each direction from the axle are connected, braced and strengthened by bracing L-shaped scraper bars 13 which are welded as shown at 13' or otherwise suitably attached to the respective teeth intermediate the axle and the shearing digging edge of the teeth and on the sides of the teeth units 6 so that when in digging position the bars 13 will be on the underside of the teeth units and will serve, not only to brace and strengthen the teeth structures but will prevent roots and brush from becoming entangled with the axle, and also serve to break up and dislodge any soil which might be brought up with the roots of the brush.

The axle 4 has controlling cam wheels 14 rigidly connected thereto at each end of the row of uprooting teeth. These cam wheels 14 have lugs 15 adjustably connected thereto at predetermined points on their outer perimeter. The lugs 15 are adjustably connected to the cam wheels 14 by bolts 16 so that the position of the lugs on the perimeters of the cam wheels may be varied by inserting bolts 16 through predetermined sets of openings 17 in the cam wheels, the purpose of which is to regulate the depth of insertion of the teeth into the ground, as shown clearly in the dot and dash line positions illustrated in Figure 2 of the drawings. The uprooting teeth 6 are held at various angles with respect to the vertical, for regulating the depth of insertion of their cutting edges into the ground by means of dogs 18. The dogs 18 are carried by levers 19 which are pivotally connected to the frame 1 as shown at 19'. Suitable link 20' and lever connections connect the levers 19 to an operating rod 21 which has an operating lever 22 thereon to which is connected a cable chain or the like 23. The cable chain or the like 23 is of sufficient length that it may be grasped by the driver of a tractor (not shown) and used for pulling the brush uprooter. During the uprooting operation of the device the ends of the dogs 18 engage the lugs 15 and hold the axle 4 and the uprooting tooth assemblies 6 carried thereby against rotary movement so that as the uprooter is pulled over the ground by a tractor (not shown) connected to the hitch 3 the teeth will dig into the ground, engage the roots of brush and uproot the brush causing it to move upwardly upon and accumulate on the upper surfaces of the teeth. At such times the brace bars 13 on the upper side of the upper inoperative or non-digging sets of teeth will act as a retarder to prevent the brush from passing upwardly of the ends of the teeth.

Figure 2:
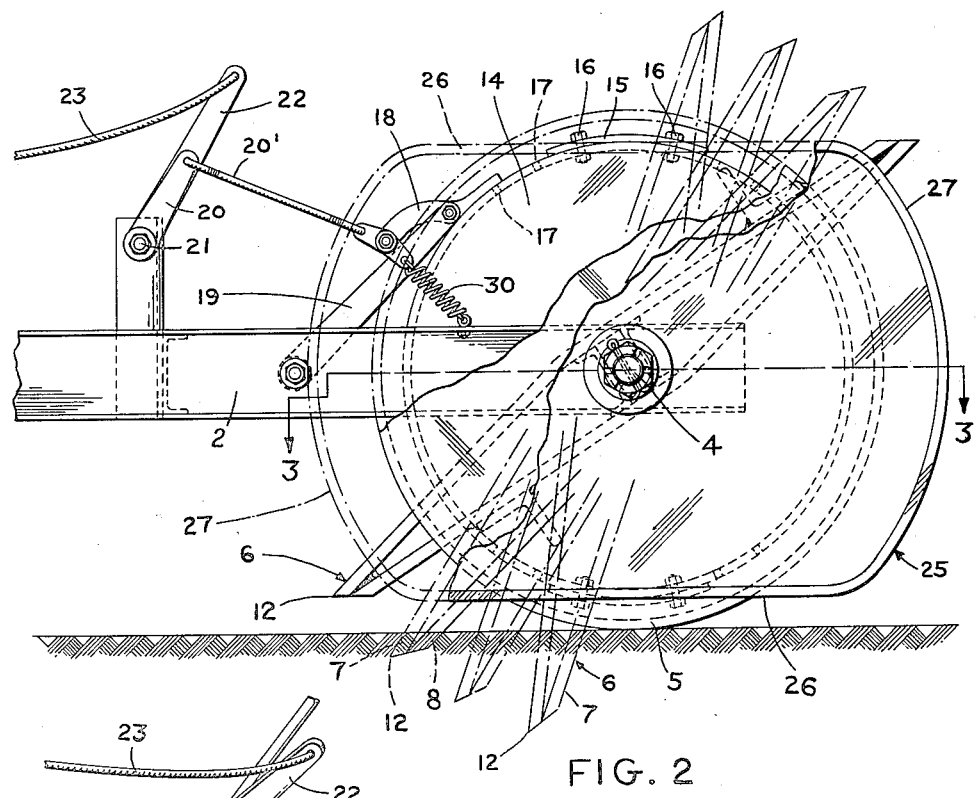
Figure 2 is an enlarged side elevation of the brush puller having parts broken away and showing the pulling teeth in various adjusted positions for regulating depth of insertion into the ground.
Figures 4, 5:
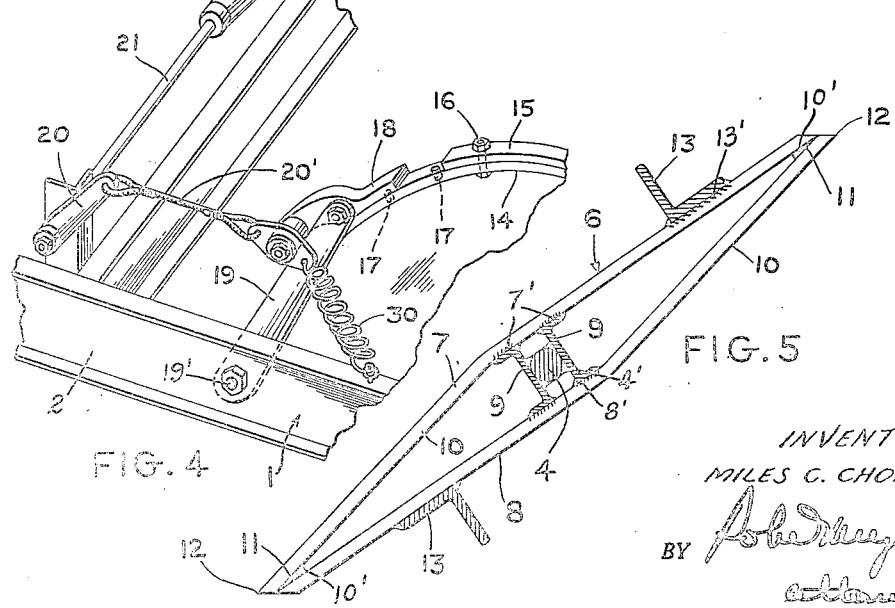
Figure 4 is an enlarged detailed view of the tripping mechanism.
Figure 5 is an enlarged detail section taken on the line 5—5 of Figure 1 and showing one of the pulling teeth in elevation.

The axle 4 has a pair of dumping wheels 25 rigidly attached thereto for rotation with the axle. These dumping wheels have portions cut away so as to provide flat parallel perimetrical portions 26 at diametrically opposite parts of the wheels and curved or arcuate perimetrical portions 27. The radii of the flat perimetrical portions 26 of the dumping wheels 25 are less than the radii of the supporting traction wheels 5, while the radii of the curved perimetrical portions 27 of the dumping wheels 25 are greater than the radii of the supporting traction wheels 5. The dumping wheels 25 are connected to the axle 4 so that during normal travel either to and from a field from which the brush is to be uprooted and during the normal brush uprooting travel of the device one of the flat portions will be presented towards the earth's surface and in spaced relation thereto as shown in Figure 2 of the drawings.

When a sufficient quantity of uprooted brush has been accumulated on the brush puller, the operator pulls the lever 22 forwardly and this moves the dogs 18 out of engagement with the lugs 15. As the uprooter progresses over the ground at this time the teeth digging into the ground cause a rotation of the axle 4 which brings the curved perimetrical portions of the dumping wheels 25 into engagement with the ground which will raise the uprooting teeth out of the ground and the rotation of the axle 4 and the pulling teeth units 6 continue for a distance traversed by the arcuate perimetrical portion of the dumping wheel which is of sufficient length to move the set of uprooting teeth which were in digging position upwardly and over into non-digging position, dumping the brush therefrom in a pile and moving the set of uprooting teeth which were in non-digging or uprooting position into digging or uprooting position. As soon as these operations have been accomplished the other flat sides of the dumping wheels will be in horizontal position and the perimeters of the supporting traction wheels will be again in contact with the ground so that the machine may proceed in its normal uprooting operation.

Springs 30 are connected to the dogs or pawls 18 and to the frame 1 for returning the pawls or dogs 18 to lug engaging positions so that after the dumping movement or operation has been completed, as just described, the pawls or dogs will again engage the lugs and hold the axle 4 against rotation and hold the uprooting teeth units in uprooting position.

It will be understood that the invention is not to be limited to the specific construction or arrangement of parts shown, but that they may be widely modified within the invention defined by the claims.

What is claimed is:

1. In a brush puller, a supporting frame, an axle rotatably carried by said frame, a plurality of brush uprooting teeth rigidly attached to and carried by said axle, supporting traction wheels carried by said axle and rotatable independently of the axle, controlling cam wheels rigidly mounted on said axle, releasable dogs engaging said controlling cam wheels to hold said teeth in brush uprooting position, and dumping wheels rigid on said axle and movable into tooth dumping position upon release of said dogs, said dumping wheels having diametrically opposed flat perimetrical parallel sections the radii of which flat sections are less than the radii of supporting traction wheels and diametrically opposed curved perimetrical sections the radii of which are greater than the radii of the supporting traction wheels whereby when one of said curved perimetrical sections is moved into ground engaging position said supporting traction wheels will be raised off the ground and the axle will be rotated by forward movement of the brush puller to move said brush uprooting teeth out of the ground and into dumping position.

2. A brush puller as claimed in claim 1 wherein said uprooting teeth comprise a series of radially opposed teeth disposed normally at acute angles to a horizontal plane bisecting the axis of said axle so that as the teeth projecting in one direction from the axle are moved in dumping direction the teeth projecting in the opposite direction will move into uprooting position.

3. A brush puller as claimed in claim 1 wherein said controlling cams have dog-engaging lugs adjustably carried thereby, whereby by adjustment of the lugs the depth of penetration of the teeth into the ground may be regulated.

4. A brush puller as claimed in claim 1 wherein said dumping wheels have flat perimetrical parallel sections of radii less than the radii of the supporting traction wheels and curved perimetrical portions have greater radii than the radii of the supporting traction wheels and wherein the dumping wheels are connected to said axle so that during uprooting operation of the device one of the flat sections of the wheels will be presented towards and spaced slightly from the surface of the ground over which the brush puller is travelling.

5. A brush puller as claimed in claim 1 wherein said controlling cams have dog-engaging lugs adjustably carried thereby, whereby by adjustment of the lugs the depth of penetration of the teeth into the ground may be regulated, manually operated means for moving said dogs out of engagement with the dog-engaging lugs, and springs for returning the dogs into lug-engaging positions.

6. A brush puller as claimed in claim 1 wherein said uprooting teeth comprising a series of radially opposed teeth disposed normally at acute angles to a horizontal plane bisecting the axis of the axle, whereby as the teeth projecting in one direction from the axle at the end of the line are moving in dumping direction the teeth projecting in the opposite direction from the axle will move into uprooting position, said controlling cams having dog-engaging lugs adjustably carried thereby, whereby by adjustment of the lugs the depth of penetration of teeth into the ground may be regulated, and an angle bracing bar attached to each set of teeth intermediate their uprooting ends and said axle and located upon opposite sides of the teeth of each set of teeth to provide obstructions for limiting the movement of uprooted brush along the teeth.

7. In a brush puller, a supporting frame, an axle carried by said frame, supporting traction wheels rotatably mounted on said axle, uprooting teeth rigidly carried by said axle, dumping wheels rigidly carried by said axle and held in operative position during uprooting operation of said teeth, means for holding said axle against rotation to maintain said teeth in uprooting position, means for releasing said holding means whereby the axle and dumping wheels are free to rotate to move the teeth into dumping position, said uprooting teeth comprising uprooting toothed units spaced longitudinally along said axle and comprising a pair of metal bars attached at their centers to said axle and extending radially and equally in opposite directions from the axle, said metal bars having their outer ends connected and angled to form knife-like shearing edges for penetration into the ground.

8. In a brush puller, a supporting frame, an axle carried by said frame, supporting traction wheels rotatably mounted on said axle, uprooting teeth rigidly carried by said axle, dumping wheels rigidly carried by said axle and held in operative position during uprooting operation of said teeth, means for holding said axle against rotation to maintain said teeth in uprooting position, means for releasing said holding means whereby the axle and dumping wheels are free to rotate to move the teeth into dumping position, said uprooting teeth comprising uprooting toothed units spaced longitudinally along said axle and comprising a pair of metal bars attached at their centers to said axle and extending radially and equally in opposite directions from the axle, said metal bars having their outer ends connected and angled to form knife-like shearing edges for penetration into the ground, and angle bracing bars attached to said teeth intermediate their knife-like shearing edges and said axle.

9. In a brush puller, a supporting frame, an axle carried by said frame, supporting traction wheels rotatably mounted on said axle, uprooting teeth rigidly carried by said axle, dumping wheels rigidly carried by said axle and held in operative position during uprooting operation of said teeth, means for holding said axle against rotation to maintain said teeth in uprooting position, means for releasing said holding means whereby the axle and dumping wheels are free to rotate to move the teeth into dumping position, said uprooting teeth comprising uprooting toothed units spaced longitudinally along said axle and comprising a pair of metal bars attached at their centers to said axle and extending radially and equally in opposite directions from the axle, said metal bars having their outer ends connected and angled to form knife-like shearing edges for penetration into the ground, scraper bars attached to said teeth intermediate the axle and the sheared digging edges of the teeth on the sides of the teeth so that when the teeth are in digging position said scraper bars will be on the underside of the teeth which are in digging position.

10. In a brush puller, a supporting frame, an axle carried by said frame, supporting traction wheels rotatably mounted on said axle, a series of radially opposed uprooting teeth rigidly carried by said axle and having their outer ends shaped to form ground penetrating edges, dumping wheels rigidly carried by said axle and held in inoperative position during uprooting operation of said teeth, means for holding said axle against rotation to maintain said teeth in uprooting position, means for releasing said holding means whereby the axle and dumping wheels are free to rotate to move the teeth into dumping position, scraper bars attached to said teeth intermediate the axle and their ground penetrating ends, said scraper bars positioned on the sides of the teeth and projecting laterally therefrom so that when the teeth are in digging position said scraper bars will be on the underside thereof.

11. A brush puller as claimed in claim 1 including angled bracing bars attached to said brush uprooting teeth intermediate of their ends, said scraper bars serving to brace the teeth and are positioned so that they will project downwardly from the sides of the uprooting teeth when the latter are in uprooting position.

12. A brush puller as claimed in claim 1 wherein said uprooting teeth comprise a series of radially opposed teeth disposed normally at acute angles to a horizontal plane bisecting the axis of said axle so that as the teeth projecting in one direction from the axle are moving into dumping direction the teeth projecting in the opposite direction from the axle will move into uprooting position, scraper bars attached to the sides of said teeth and projecting laterally therefrom in a direction so that when the teeth are in uprooting position the scraper bars will be on the underside of the teeth and when the teeth are in dumping position the scraper bars will be up on the upper sides of the teeth.

MILES C. CHOATE.

REFERENCES CITED

The following references are of record in the file of this patent:

UNITED STATES PATENTS

| Number | Name | Date |
| --- | --- | --- |
| 885,897 | Weeks | Apr. 28, 1908 |
| 1,222,526 | Clayton | Apr. 10, 1917 |
| 1,817,450 | Watkins | Aug. 4, 1931 |
| 2,379,280 | Couch | June 26, 1945 |
| 2,436,245 | Bloom | Feb. 17, 1948 |